Patented May 7, 1946

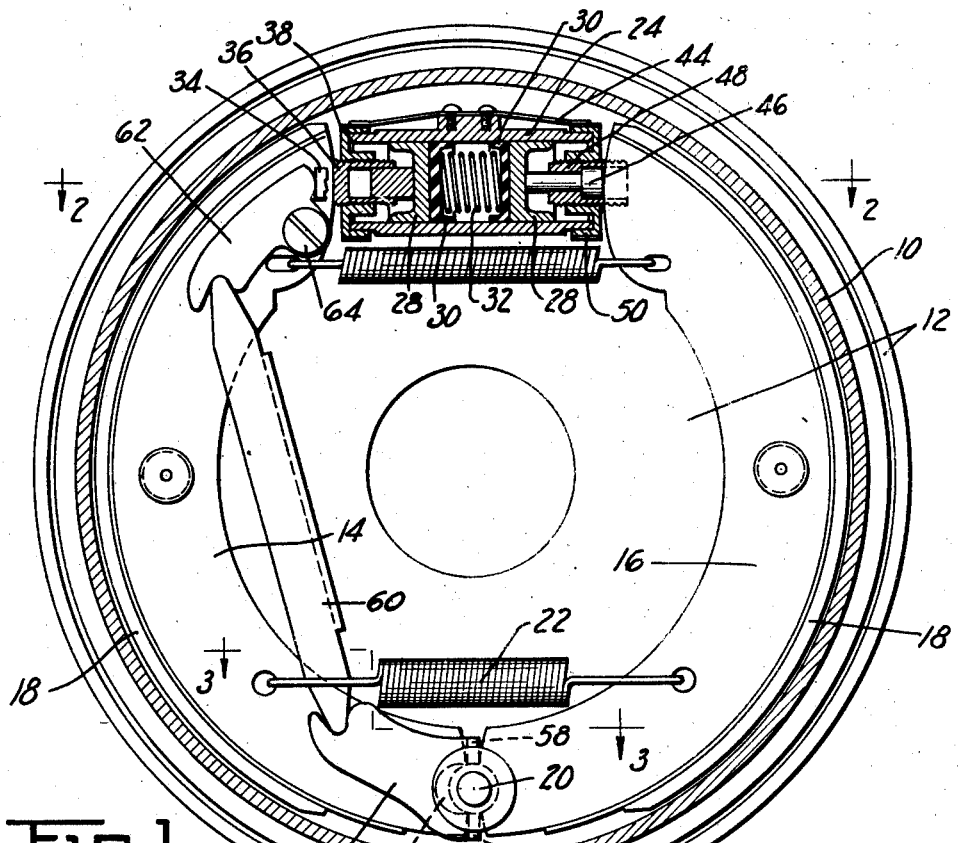
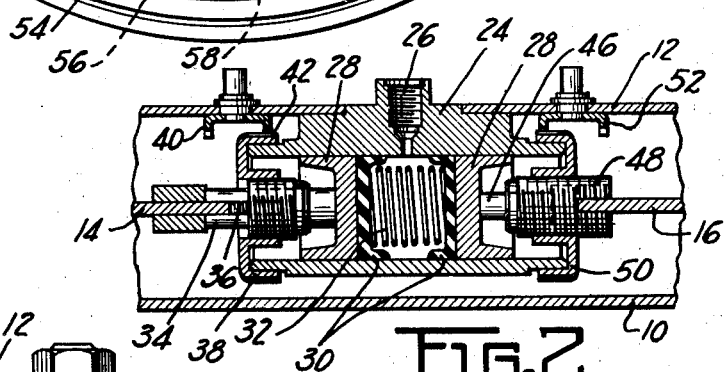
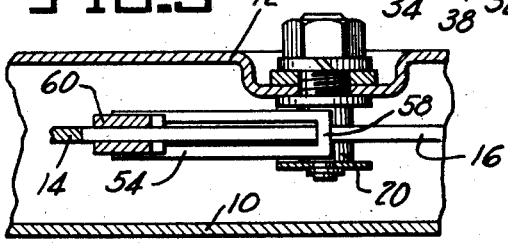

2,400,042

UNITED STATES PATENT OFFICE 2,400,042

BRAKE ACTUATOR

Rudolph A. Goepfrich, South Bend, Ind., assignor to Bendix Aviation Corporation, South Bend, Ind., a corporation of Delaware Original application December 26, 1939, Serial No. 311,044, now Patent No. 2,351,952, June 20, 1944. Divided and this application July 10, 1943, Serial No. 494,160

4 Claims. (Cl. 188—152)

This invention relates in general to brakes, and in particular to improvements in actuators for fluid operated brakes. The present application is a division of application Serial No. 311,044, filed December 26, 1939, and issued as Patent No. 2,351,952 on June 20, 1944.

An object of the present invention is to provide an improved brake actuator which also acts as an anchor for one or more brake shoes.

A further object of the present invention is to provide a wheel cylinder which is capable of exerting an applying force against the brake shoe even though the shoe is at the time anchored on the wheel cylinder.

The foregoing and other objects of the invention will be apparent from the following description, but it is to be understood that the description relates only to a preferred embodiment of the invention, and that the scope of the invention is limited only by the terms of the claims appended to this specification.

In the drawing, which illustrates a preferred embodiment of the invention:

Figure 1 is a vertical section taken inside a backing plate of a drum-type brake showing the fluid actuator in longitudinal section.

Figure 2 is a section taken along the line 2—2 of Figure 1; and

Figure 3 is a section taken along the line 3—3 of Figure 1.

The brake illustrated in Figures 1 to 3 comprises a drum 10, at the open side of which is a support or backing plate 12, and within which are arranged brake shoes 14 and 16 faced with suitable brake lining 18. The lower ends of the shoes are notched to fit against opposite sides of a fixed anchor post 20 mounted on the anchor plate 12, a spring 22 being tensioned between the shoes 14 and 16 to urge them toward this anchorage.

For actuating the shoes 14 and 16 there is provided a cylinder 24 connected at a port 26 to a pressure line (not shown) of a conventional fluid braking system. Within the cylinder 24 are a pair of pistons 28, the inside faces of which are provided with sealing cups 30, held in position by a spring 32.

Adapted to cooperate with the left hand piston member 28 is a plunger 34 which is slotted in the manner shown to embrace the web of the shoe 14. The slotted plunger 34 also embraces an adjustable anchoring member 36 which is screwed into an anchoring cap 38 which fits over and anchors against the end of the wheel cylinder 24.

For adjusting the position of the brake shoe 14 a crown gear 40 is provided, adapted to cooperate with serrations 42 of the anchor cap 38. For locking the anchor cap 38 in position a spring member 44 is provided, which has its ends arranged as a pawl to cooperate with the serrations 42.

The right end of the wheel cylinder 24 may be provided with a construction exactly like that which has just been described, but as an alternative may take a form which will now be described. The right hand piston member 28 is adapted to cooperate with a plunger 46 which is forked at its right end to engage the web of the shoe 16. Cooperating with the plunger 46, is an exteriorly threaded member 48 which is slotted to be engaged by the web of the shoe 16 and which has two inside diameters thus providing a shoulder against which the plunger member 46 abuts. For adjusting the position of the threaded member 48, and the plunger member 46, there is provided a cap 50 threadably engaged to the member 48, and which anchors against the right end of the wheel cylinder 24. For rotating the cap 50 a crown gear 52 similar to crown gear 40 is provided. The anchor cap 50 may be held in locked position by the spring 44 which is adapted to act as a pawl to engage serrations in the cap 50 in a manner similar to that with the left anchor cap 38.

The lower end of the web of shoe 14 is straddled by two parts of a floating bell crank lever 54, notched as at 56 to form integral connecting portions 58 which in effect form cams above and below the anchor 20 between the ends of the webs of the two shoes. The notch 56 permits the lever 54 to float horizontally along a chord of the drum, with the shoes, as one shoe or the other anchors on post 20 when the brake is applied; and since the notch 56 embraces the anchor post 20 the post prevents vertical movement of the lever. The lever 54 cooperates with a U-section thrust link 60, adapted to straddle the web of the shoe 14 in the manner shown, and a pair of bell crank levers 62 pivoted at 64 on the upper end of the web of the shoe 14. As shown, the end of the plunger 34 is in contact with each bell crank lever 62.

In operation, the pistons 28 are forced apart hydraulically to apply the brake. The right hand piston 28 acts through the plunger 46 directly upon the shoe 16. The left hand piston 28 acts through the plunger 34 on the levers 62 to act upon the thrust link 60 and the bell crank lever 54. If the drum is turning clockwise shoe 16 is actuated by the right hand piston 28 and anchors on the post 20, while shoe 14 is actuated by cam lever 54 and anchors on the cap 38. If the drum is turning counterclockwise the shoe 14 is actuated by the thrust of the plunger 34 on the lever 62 and anchors on the post 20, while the shoe 16 is actuated by the cam lever 54 and anchors on the cap 50.

Continued operation of the brakes causes wear on the linings, and to bring the linings to a desired clearance at the drums anchor caps 38 and 50 are rotated by means of the crown gears 40 and 52. Rotating crown gear 40 effects rotation of anchor cap 38 causing the bridge member 36 to be moved against the web of shoe 14. The residual pressure in wheel cylinder 24 and the load in spring 32 moves plunger 34 and its attendant piston 28 to the left until the plunger 34 engages levers 62. Similarly, the adjustment of shoe 16 is obtained. Rotation of anchor cap 50 by means of crown gear 52 moves threaded member 48 and plunger member 46 to the right. The residual pressure in wheel cylinder 24 and the load in spring 32 moves the attendant piston 28 to the right. Thus, with the shoes adjusted in the manner described a minimum amount of travel of the pistons 28 is required to bring shoes 14 and 16 into engagement with the drum upon brake actuation.

While two illustrative embodiments of the actuator have been described in detail it is not the intention to limit the scope of the invention to the particular embodiments shown nor otherwise than by the appended claims.

I claim:

1. A combined actuator and anchor member for a brake shoe comprising a cylinder, a piston reciprocable in the cylinder, a cap on the end of the cylinder serving as an anchor for the shoe, and a piston actuated plunger extending through said cap and axially movable relative to the cap and shoe, the outer end of the plunger overlying the anchoring end of the shoe and being formed to permit outward movement of the plunger relative to the shoe regardless of the position of the shoe.

2. A combined actuator and anchor member for a brake shoe comprising a cylinder, a piston reciprocable in the cylinder, a cap on the end of the cylinder serving as an anchor for the shoe, said cap having a threaded central opening, an adjustor screwed in the opening in said cap and in contact with the end of the shoe, means for preventing rotation of the adjustor in order that the released position of the shoe may be adjusted by rotating the cap, and a plunger extending through said adjustor and axially movable relative to the cap and adjustor, said plunger being actuated by the piston and being operatively associated with the shoe, thereby permitting actuation of the shoe by the piston when the shoe is anchored on the adjustor and cap.

3. A combined actuator and anchor member for a brake shoe comprising a cylinder, a piston reciprocable in the cylinder, a cap on the end of the cylinder serving as an anchor for the shoe, said cap having a threaded central opening, an adjustor screwed in the opening in said cap and in contact with the end of the shoe, means for preventing rotation of the adjustor in order that the released position of the shoe may be adjusted by rotating the cap, and a plunger extending through said adjustor and axially movable relative to the cap and adjustor.

4. A combined actuator and anchor member for a brake shoe comprising a cylinder, a piston reciprocable in the cylinder, an adjustable anchor member on the end of the cylinder which the shoe contacts when it anchors at that end, and a plunger extending through said anchor member and axially movable relative thereto, the outer end of the plunger overlying the anchoring end of the shoe and being formed to permit outward movement of the plunger relative to the shoe regardless of the position of the shoe.

RUDOLPH A. GOEPFRICH.